Feb. 16, 1932.  F. G. BENSON  1,845,475
SOLDERING IRON
Filed Sept. 11, 1930  2 Sheets-Sheet 1
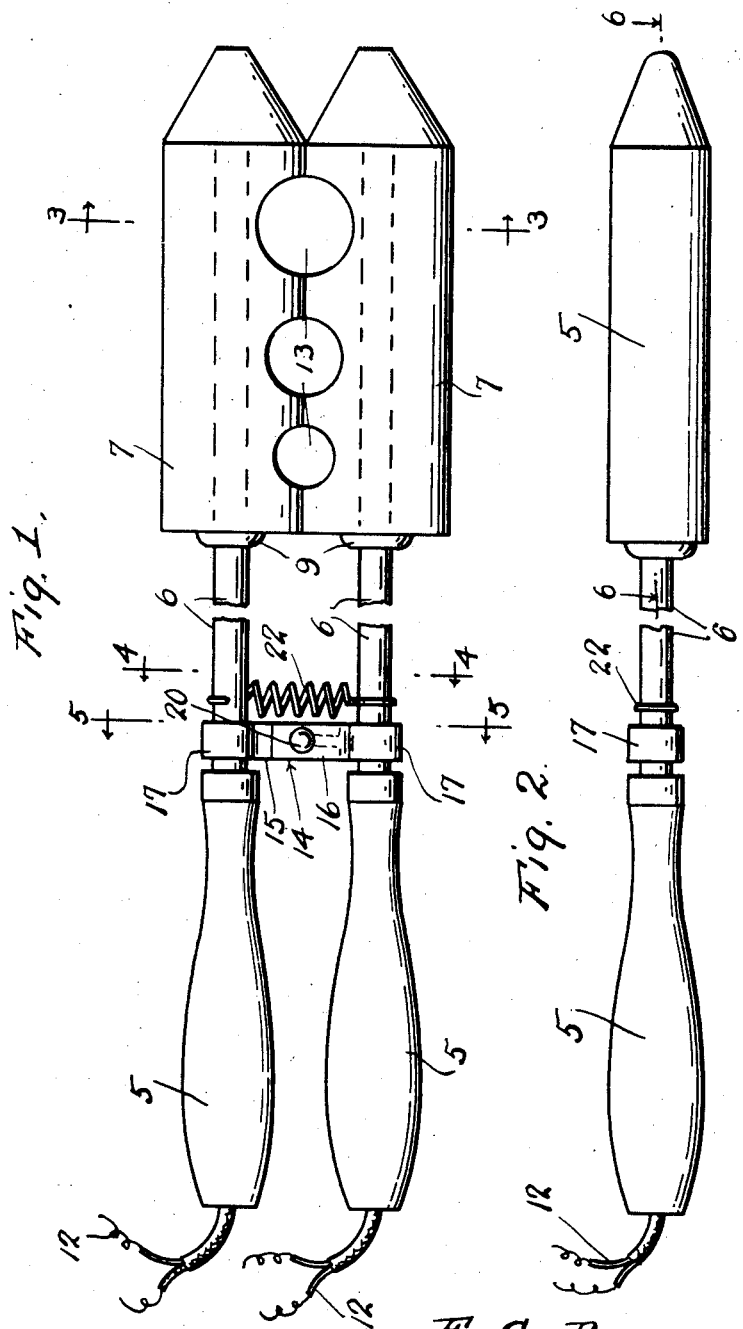
Inventor
F. G. Benson
By Clarence A. O'Brien
Attorney

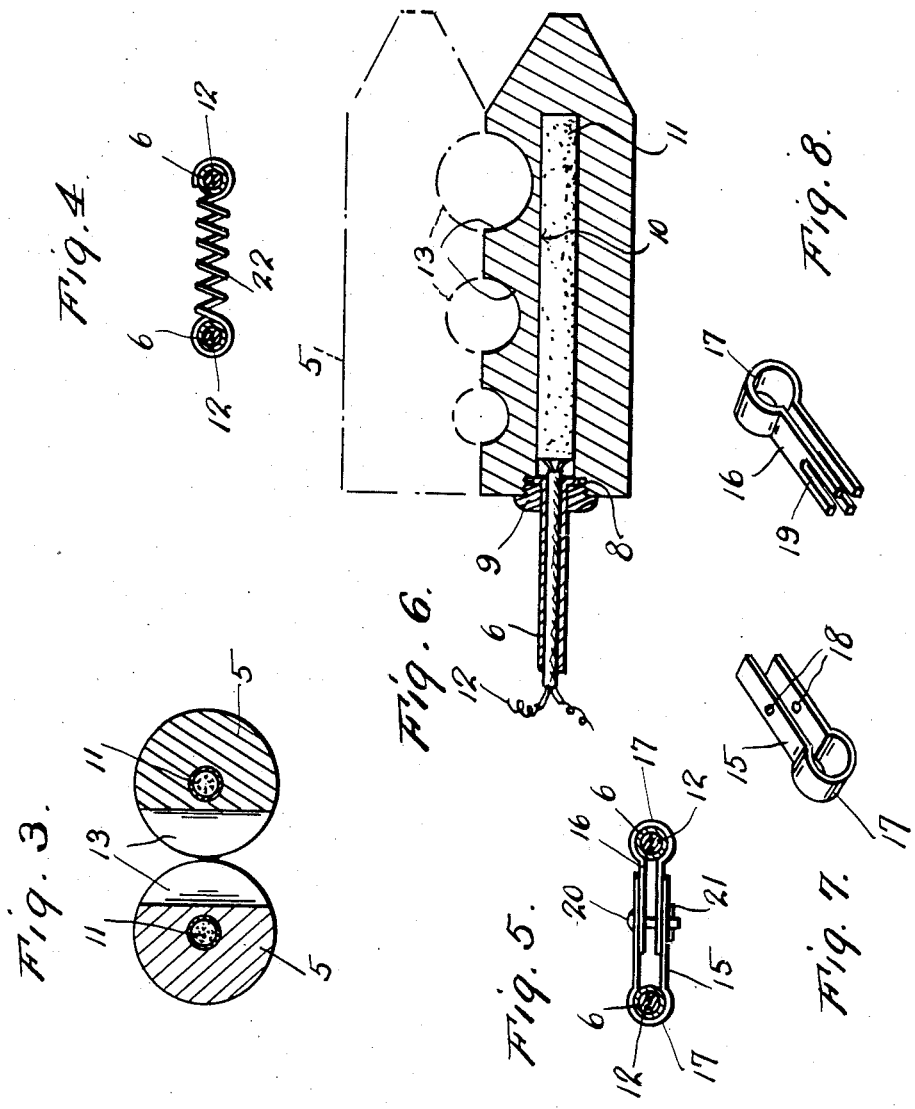

Patented Feb. 16, 1932

1,845,475

UNITED STATES PATENT OFFICE

FLENNER G. BENSON, OF HOPEWELL, VIRGINIA

SOLDERING IRON

Application filed September 11, 1930. Serial No. 481,280.

This invention appertains to new and useful improvements in soldering irons, particularly to a double iron construction devised for the soldering of terminals to wires or other cylindrical articles, in a quick and practical manner.

An important object of the invention is to provide a double iron constructed and used as a unit for the above purpose and being separable to permit their use as a single soldering iron.

Other important objects and advantages of the invention will readily become apparent to the reader of the following specification.

In the drawings:—

Figure 1 represents a top plan view of the novel device.

Fig. 2 represents a side elevational view of the novel device.

Fig. 3 represents a cross sectional view taken substantially on the line 3—3 of Fig. 1.

Fig. 4 represents a cross sectional view taken substantially on the line 4—4 of Fig. 1.

Fig. 5 represents a cross sectional view taken substantially on line 5—5 of Fig. 1.

Fig. 6 represents a sectional view taken substantially on the line 6—6 of Fig. 2.

Fig. 7 represents a perspective view of one section of the total connector.

Fig. 8 represents a perspective view of the other section of the pivotal connector.

Referring to the drawings wherein like numerals designate like parts, it can be seen that each of the iron units includes a handle 5, the said handle being provided with a bore therethrough for receiving one end portion of the conduit 6 which serves as a shank for the handle and protrudes into its corresponding iron 7, to be anchored thereto as at 8. The end portion of the iron 7 in which the end of the conduit 6 is anchored is also internally threaded to receive the screw plug 9 which assists in securing the conduit 6 to its iron.

The iron 7 has a bore 10 leading the same for a substantial distance to receive the heating unit 11, the wires from which leads through the conduit 6 and are denoted by numeral 12.

Each of the irons 7 is provided with several semi-circular-shaped indentures 13 of various sizes, so that when the irons 7 are brought together in the manner shown in Fig. 1, circular openings will be provided which when placed over the terminal will permit the iron to be used as molds in which molten solder can be placed for connecting cables or wires to the terminals.

For pivotally connecting the irons together, when they are used in assembled form, a clamp generally referred to by numeral 14 is employed. This clamp includes the section 15 and the section 16, each of which is provided with a looped intermediate portion 17 and a pair of legs extending therefrom, one of which is provided with apertures 18, while the legs of the other section are provided with slots 19.

A pin and key 21 are employed for pivotally connecting these sections together so that the irons can be separated when desired. A coiled spring 22 interposed between the conduits 6 serves to maintain the irons contracted in molding position when the irons are being so used.

Obviously by disengaging section 15 and section 16 by pulling handles 5 apart and unhooking spring allowing the individual use of the irons.

While the foregoing specification sets forth the invention in specific terms, it is to be understood that numerous changes in the shape, size and materials may be resorted to without departing from the spirit and scope of the invention as claimed hereinafter.

Having thus described my invention, what I claim as new is:—

A soldering iron comprising an iron part, a point at one end thereof, a shank connected with the other end, a handle connected with the shank, a heating element passing longitudinally through the center of the iron part and terminating short of the point, conductors passing through the shank and connected with the heating element, said iron part having a number of recesses in one side thereof, said recesses being of different sizes whereby when the iron is combined with a similar iron, the recesses of the two irons will form molds of different sizes, a clamp for detachably connecting the shanks of two irons together with the iron parts contacting each other, said clamp comprising two parts pivotally connected together, and a spring connecting the shank of the iron with the shank of a similar iron to hold the iron parts in engagement.

In testimony whereof I affix my signature.

FLENNER G. BENSON.